Sept. 20, 1932. W. E. SYKES 1,878,729
CHANGE SPEED GEARING FOR ROLLING MILLS AND THE LIKE
Filed June 7, 1927 4 Sheets-Sheet 1
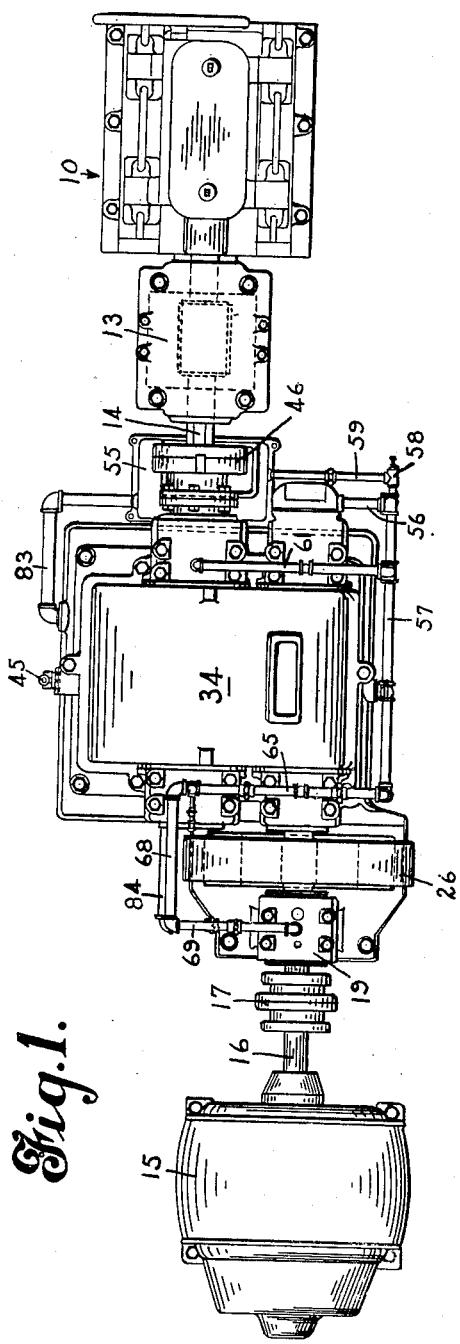
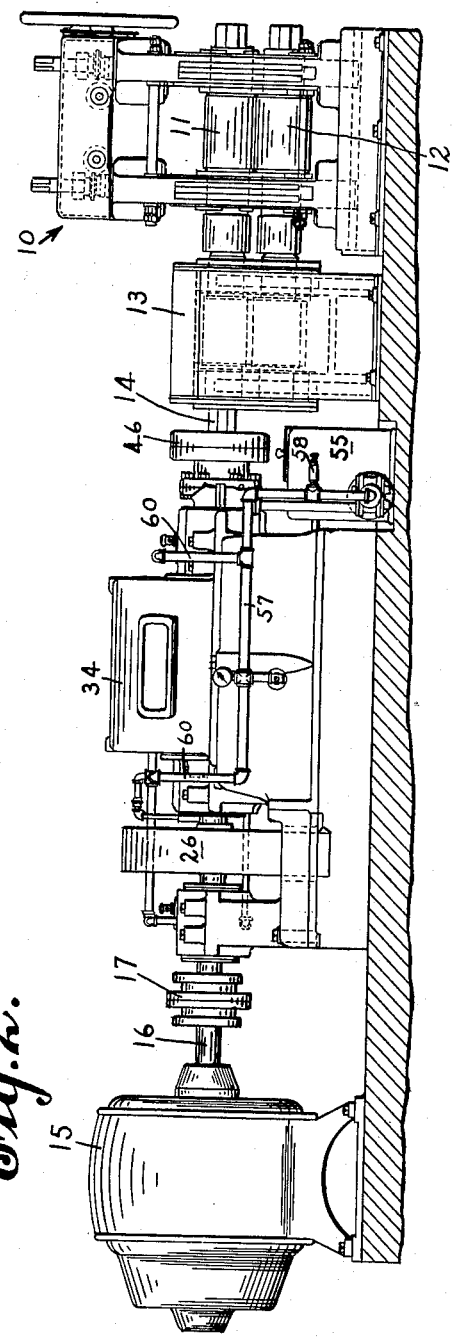
Inventor
William E. Sykes
By Rockwell & Bartholow
Attorney

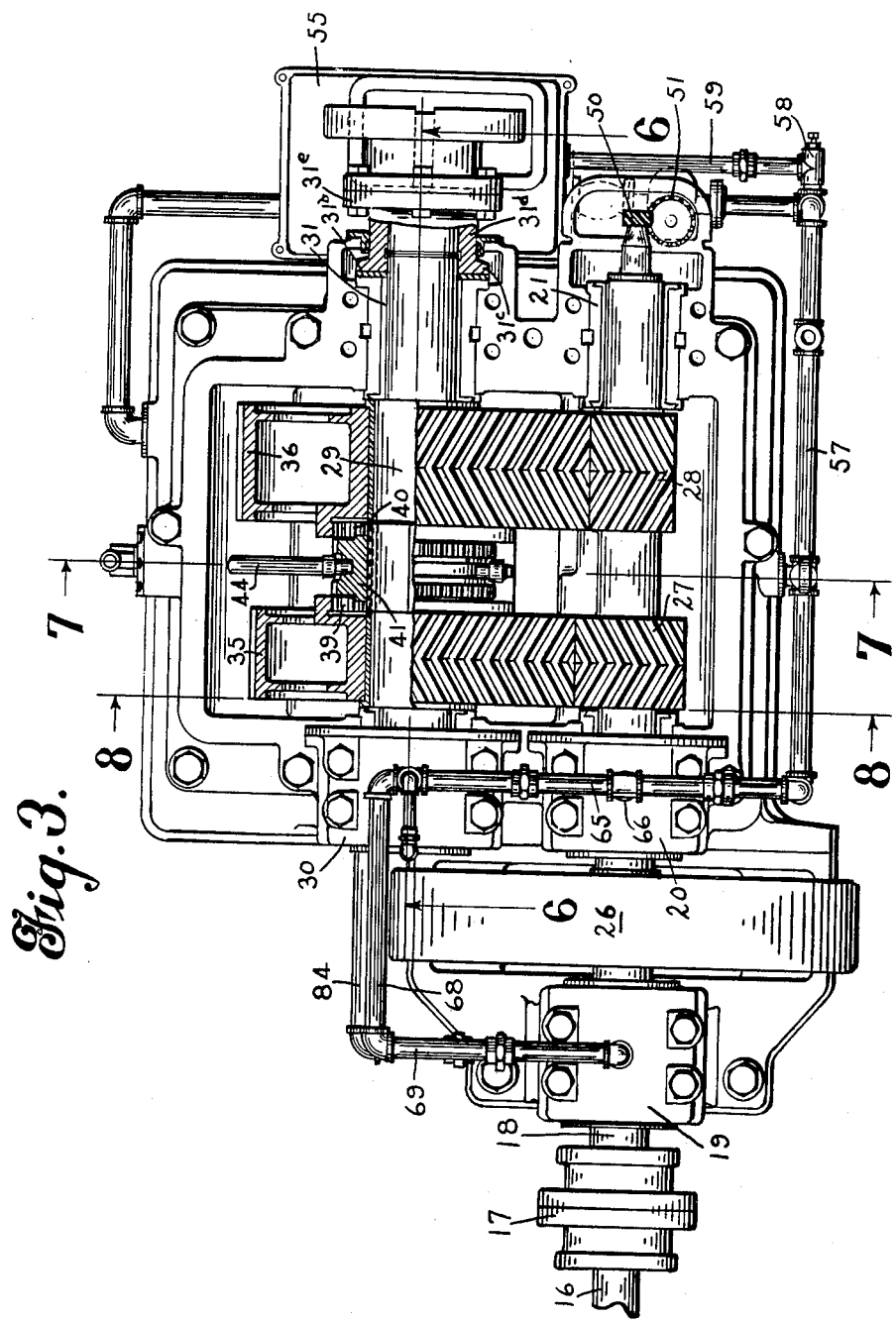

Sept. 20, 1932.  W. E. SYKES  1,878,729
CHANGE SPEED GEARING FOR ROLLING MILLS AND THE LIKE
Filed June 7, 1927  4 Sheets-Sheet 3

Inventor
William E. Sykes
By
Bucknell & Bartholow
Attorney

Sept. 20, 1932.  W. E. SYKES  1,878,729
CHANGE SPEED GEARING FOR ROLLING MILLS AND THE LIKE
Filed June 7, 1927   4 Sheets-Sheet 4

Inventor
William E. Sykes
By Rockwell & Bartletow
Attorney

Patented Sept. 20, 1932

1,878,729

UNITED STATES PATENT OFFICE

WILLIAM E. SYKES, OF BUFFALO, NEW YORK

CHANGE SPEED GEARING FOR ROLLING MILLS AND THE LIKE

Application filed June 7, 1927. Serial No. 197,101.

In the past it has been the custom in providing gear drives for heavy machinery, such as rolling mills and the like, either to provide a variable speed direct current motor with a gear reduction unit between the motor and the mill and to obtain different mill speeds by varying the speed of the motor or to obtain higher or lower speeds by keeping on hand extra gears and pinions which could be substituted to replace those used at a given mill speed. Neither of these arrangements has been entirely satisfactory. In connection with the use of a variable speed motor, if a fly-wheel were used on the driven shaft sufficiently heavy for the lower speeds it was too heavy for the higher speeds, and vice versa. The result was that a compromise was usually effected and a fly-wheel provided which did not meet the requirements for either high or low speeds. If a constant speed motor were used and a variable speed obtained from change gears, it, of course, required considerable time to effect the change and during this time the mill would be shut down.

Moreover, when ordinary gears were used in such an arrangement it was required that the shafts be set a considerable distance apart in order that the required speed reduction could be obtained, due to the fact that a pinion not integral with the shaft must be of sufficient size to permit its teeth to be cut to the required depth, and to obtain the required reduction a gear of large size was required to be used with such a pinion.

I contemplate by my invention a gear drive for rolling mills, or the like, having a driving shaft and a driven shaft with two pairs of meshing gears to obtain the different speeds so that a constant speed motor may be used. In this construction double helical gears and pinions preferably are employed, the pinions on the driving shaft being formed integrally therewith so that they may be made of relatively small size. With the use of a relatively small pinion to obtain the higher speed reduction and the employment of a relatively high tooth angle, say, approximately 30°. I am enabled to place the driving and driven shafts closely together, and still obtain the proper speed reduction for the low ratio gear and pinion. This construction permits the use of a relatively small pinion for the low ratio drive and therefore will avoid an excessively high tooth velocity, which would be present if a pinion of large diameter were used.

Moreover, by employing a two-speed drive of this character I may use a constant speed alternating current motor and the flywheel on the driven shaft may be properly designed for this constant speed of the motor which does not vary, regardless of the ultimate speed of the mill rollers.

The gears on the driven shaft will preferably be loosely mounted thereon and designed to be clutched thereto with a gear tooth clutch. I have found that in a heavy rolling mill drive of this description, especially where a fly-wheel is used, the seizure of the bearings of the gears on the driven shaft often results in serious breakage, and it is, therefore, essential that these bearings be well lubricated. This problem has been solved by my providing the driving shaft with an internal bore from which radial passages lead to the bearings of the gears, and supplying a lubricant under pressure to this bore so that the bearings will be supplied with force feed lubrication.

One object of my invention is to provide a compact unitary drive for rolling mills or other heavy machines.

Another object of my invention is to provide a variable speed rolling mill drive of this character with which a constant speed motor may be used, and a fly-wheel of suitable weight provided on the driving shaft.

Another object of my invention is the provision of a variable speed drive for rolling mills or the like, in which the change speed gears are constantly in mesh and the driven gears are rotatably mounted upon the driven shaft, and designed to be clutched thereto when the device is in operation.

Another object of my invention is to provide a variable speed drive for rolling mills or the like, having change speed gears which are constantly in mesh and some of which are rotatably mounted on their supporting shafts, and are provided with positive lubrication so that excessive wear of the parts will not be experienced.

A still further object of the invention is to provide a variable speed driving unit for rolling mills or other heavy machinery, having an improved lubricating system.

To these and other ends, the invention consists in the novel features and combinations of parts to be hereinafter described and claimed.

In the accompanying drawings:

Fig. 1 is a top plan view of a rolling mill and driving means therefor, embodying my invention;

Fig. 2 is a side view of the same;

Fig. 3 is a top plan view of the driving unit between the motor and the rolling mill, the cover of the gear housing being removed and certain parts being shown in section;

Figure 4:
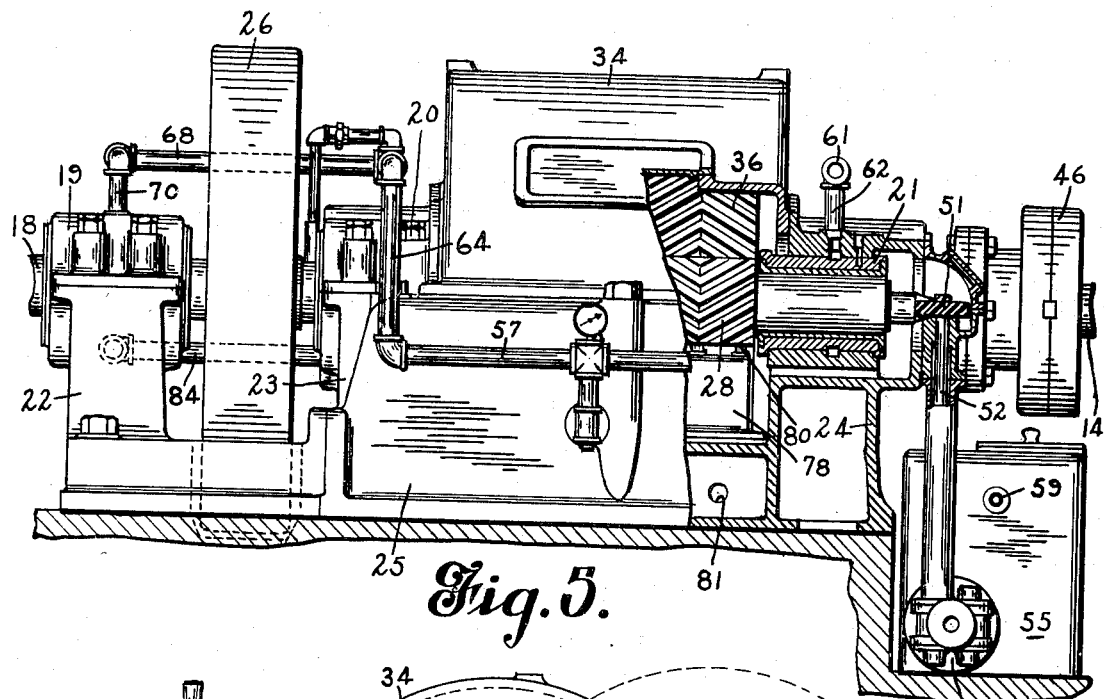
Fig. 4 is a side view of the driving unit, certain parts being broken away to show the interior construction.
Figure 5:
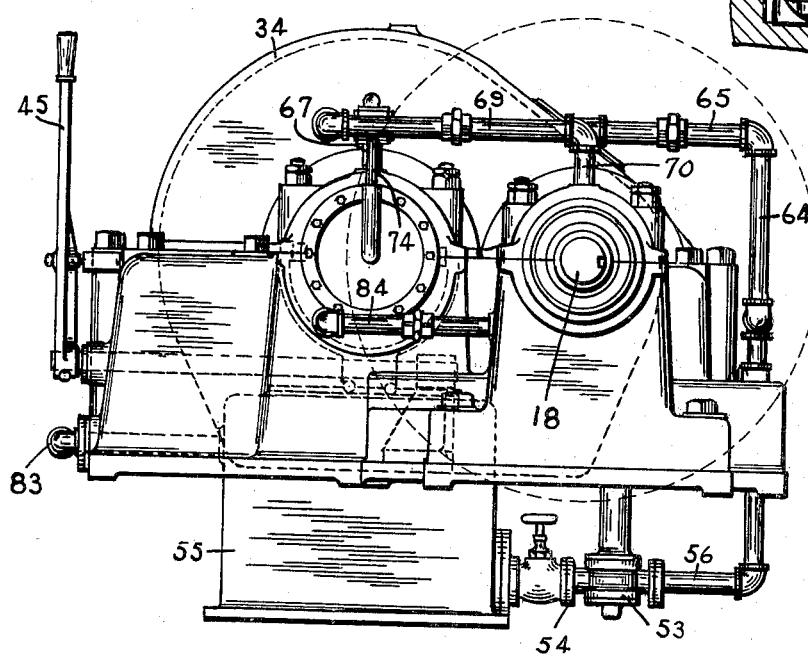
Fig. 5 is an end view of the driving unit, the motor being omitted.

To illustrate a preferred embodiment of my invention, I have shown somewhat diagrammatically a rolling mill 10, having rolls 11 and 12, the shafts of which are connected through suitable gearing in the gear housing 13, to a driven shaft 14 which ultimately receives its power from a prime mover or motor 15.

Between the motor and the shaft 14 is placed my improved driving unit, which provides for the driving of the shaft 14 at variable speeds relatively to the speed of the shaft 16 of the motor, which in this instance, is preferably a constant speed alternating current motor.

The motor shaft 16 is connected by a universal coupling 17 to a driving shaft 18, supported in bearings 19, 20 and 21, arranged in suitable standards 22, 23 and 24, which rise from the base plate or web 25, arranged to support the driving unit. Between the bearings 19 and 20 is arranged a fly-wheel 26, which may be accurately designed according to the speed of the motor and shaft 18. As the motor will preferably and ordinarily run at a constant speed, the fly-wheel may be designed so as to be of the proper weight for this speed.

Between the bearings 20 and 21 of the shaft 18, pinions 27 and 28 are provided, the latter being smaller in diameter than the former. These pinions are preferably formed integrally with the shaft 18, as by this arrangement they may be made of smaller diameter than when formed separately and mounted upon the shaft, and thus the proper gear ratio between these pinions and the driven gears may be obtained without using an excessively large driven gear which might lead to an excessive high tooth velocity. Also, when these pinions are relatively small, the driving and driven shafts may be set relatively close together and at the same time the proper variations in speed obtained without the necessity of changing the gears.

The standards 23 and 24, as shown, for instance, in Fig. 3, extend across the driving unit, and in these standards are also provided bearings 30 and 31 for the driven shaft 29. These two standards form the sides of a gear housing 32, which is closed by a bottom plate 33, and a cover plate 34, the latter being removable so as to give access to the gears. This housing will, of course, be kept closed during the operation of the device.

Figure 6:
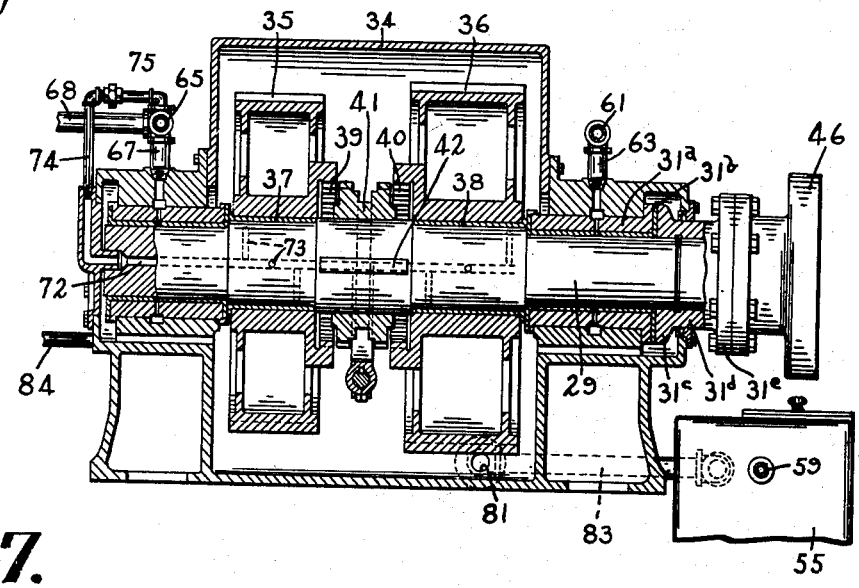
Fig. 6 is a sectional view on line 6—6 of Fig. 3.

On the shaft 29 are rotatably mounted gears 35 and 36, which are constantly in mesh respectively with the pinions 27 and 28. These pinions and gears will preferably be of the double helical or herringbone type, as in such case, the gears 35 and 36 may be mounted upon bushings 37 and 38 rotatable on the shaft 29, and will be maintained in position longitudinally of the shaft by the engagement with their teeth with the teeth of the pinions. No additional means is necessary to prevent longitudinal displacement of these gears. On the opposing faces of the two gears 35 and 36 are provided clutch teeth 39 and 40, with which is adapted to be engaged the teeth of a clutch 41, slidably mounted on the shaft 29 between these gears. This clutch is non-rotatably secured to the shaft by means of the splines or keys 42 and may be shifted longitudinally of the shaft by means of the shifting yoke 43, secured to the rock shaft 44, operated by the lever 45. It will be apparent that by moving the lever 45 to the proper position, the clutch may be set in a neutral position, as shown in Fig. 6, or may be connected selectively with the gears 35 or 36. These two gears are, as shown, of different diameters, as is also true of the pinions 27 and 28, so that a two speed drive is arranged between the shaft 29 and the motor shaft 16.

The shaft 29 may be connected to the shaft 14 by means of a flanged coupling member 46, which may be of any suitable character.

At the right hand end of the shaft 18 is provided a spiral gear 50, which meshes with a gear 51, mounted at the upper end of a vertical shaft 52 leading to and operating an oil pump, designated generally at 53. The oil pump has an intake pipe 54 leading to the oil reservoir 55, from which the pump draws the oil and forces it to various parts of the driving unit. The pump outlet is designated at 56 and leads upwardly to a horizontal pipe 57, shown more especially on Figs. 2, 3 and 4. Also connected to the outlet 56 of the pump is a pressure relief valve 58 which, if the pressure in the oil system gets too high, permits the oil to flow back through the pipe 59 into the oil reservoir 55 to relieve the pressure. From the horizontal pipe 57 a pipe 60 leads upwardly to connect with a horizontal oil conduit 61, which supplies lubricant through the pipes 62 and 63 to the bearings 21 and 31, respectively.

The pipe 57 is carried across the front of the machine to connect with a vertically extending conduit 64, which rises above the machine and connects with a horizontal pipe 65 to supply lubricant through the conduits 66 and 67, to the bearings 20 and 30, respectively. The pipe 65 is also extended to be connected with the pipe 68, which through the pipes 69 and 70 supply the lubricant to the bearing 19.

It has already been noted that the gears 35 and 36 are loosely mounted on their supporting shaft 29, and these gears rotate freely on this shaft, except when secured thereto by means of the clutch 41. It is, therefore, highly important to provide means for properly lubricating the bushings on the shaft 29, upon which these gears are mounted. To this end I provide a bore 72 in the shaft 29, and arrange a number of radial outlets 73, leading from this bore to the bushings of the gears 35 and 36. The lubricant is supplied to the bore 72 by means of a pipe 74, which through the pipe 75 connects to the horizontal pipe 65, previously described. With this arrangement, it will be apparent that oil will be positively forced through the bore of the shaft 29 and into the bearings of the gears 35 and 36 upon this shaft, so that a forced feed lubrication will be provided at these points.

Figure 7:
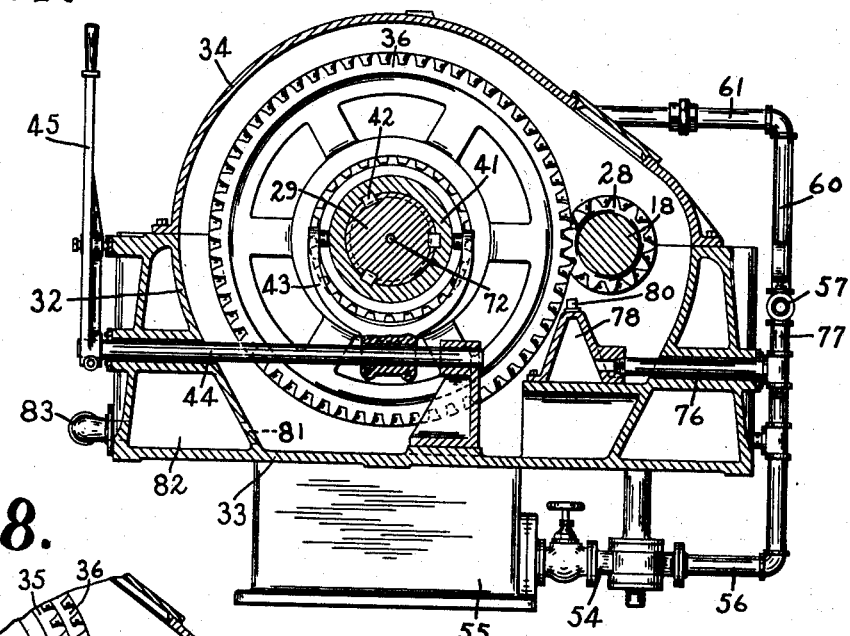
Fig. 7 is a sectional view on line 7—7 of Fig. 3.
Figure 8:
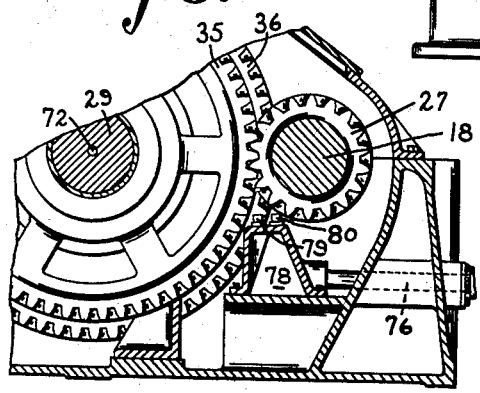
Fig. 8 is a sectional view on line 8—8 of Fig. 3.

An oil pipe 76, shown in Fig. 7, connected with the horizontal pipe 57, by means of the nipple 77, leads into an auxiliary oil tank or reservoir 78, arranged below the pinions 27 and 28, and in front of the gears 35 and 36. Oil spray nozzles 79 and 80 are arranged in the top of this reservoir to spray the oil upon the gears and pinions at substantially the point of engagement of the teeth thereof, so that the engaging portions of these elements will always be properly lubricated.

It will be apparent that all of the oil distributed to the bearings 20, 21, 30 and 31, and the oil delivered to the gears and pinions through the spray nozzles 79 and 80, will all fall to the bottom of the gear housing 32 from whence this oil will drain through an opening 81 to a passage 82, with which communicates a pipe 83 on the back of the unit to carry the oil to the oil reservoir 55, so that it will be taken up by the pump and used over and over again. The oil delivered to the bearing 19 is drained into the gear housing 32 by means of the pipe 84, so that this oil will efficiently be carried back to the oil reservoir and not be wasted.

Within the bearing 31 is a stuffing collar 31$^a$ surrounding the driven shaft 29 and having, at its end, a thrust flange 31$^b$. Bearing against this thrust flange is the flange 31$^c$ of a thrust collar 31$^d$, having a flange 31$^e$ at its other end secured to the flange coupling 46. It will be understood that the thrust collar 31$^d$ is secured to the shaft 29 by suitable means. With this arrangement, any wear which may occur at the end of the thrust collar 31$^d$ may be taken up by the insection of shims between the flange 31$^e$ and the flange of the coupling 46, so that the driven shaft will not be displaced longitudinally. This may be done without dismantling the gear unit, as the flange 31$^e$ is positioned without the gear housing in an accessible position.

I prefer to use double helical gears, the teeth of which have a comparatively high helix angle, for instance 30°. With the use of gears of this character and with the use of straight or involute spur teeth for the sliding clutch between the gears on the driven shaft, it is unnecessary to employ thrust collars or equivalent means on the driven shaft to hold the gears in position. Their position will be determined by the engagement of their teeth with the teeth of the pinions on the high speed shaft.

With a drive of this character, and particularly when the pinions on the high speed shaft are formed integrally with the shaft, it is possible to use a comparatively small center distance between the driving and driven shafts. This, in turn, permits the use of low and high ratio pairs of gears on the same center distance as the low ratio drive can be obtained without an abnormally large pinion which would result in an objectionable high tooth velocity.

It will be apparent that all parts of the drive are efficiently lubricated so that wear will be reduced to a minimum. The gears on the low speed or driven shaft are provided with a positive force feed lubrication and the clutch between these gears is lubricated by drainage from the gear bearings. Moreover, when the oil is sprayed upon the meshing teeth of the gears and pinions, as illustrated, they are effectively lubricated without the oil being churned, and the latter may be used for a long period of time without change. It will be understood, of course, that a suitable oil strainer is arranged in the lubricating system so that the oil is cleaned before being supplied to the various bearing surfaces.

What I claim is:

1. In a driving unit comprising a gear housing having shafts mounted in bearings in the ends thereof, and meshing gears mounted on said shafts, a main lubricant reservoir, means to convey oil from the lower part of said housing to said reservoir, means cooperating with a part of the housing to form an auxiliary reservoir within the housing, a pump adapted to pump the oil from the main reservoir to said bearings and to the auxiliary reservoir and create oil pressure therein, a nozzle mounted at the upper portion of said auxiliary reservoir in proximity to the meshing teeth of said gears and directing a spray of oil thereon, said auxiliary reservoir being of large capacity relatively to that of the nozzle.

2. In a driving unit comprising a gear housing having a plurality of pairs of meshing gears operatively mounted therein, a main oil reservoir positioned below the housing, means to convey oil from the housing to said reservoir, means cooperating with a part of the housing to form an auxiliary reservoir within said housing above the bottom thereof but below the meshing teeth of said gears, a pump adapted to pump oil from the main reservoir to the auxiliary reservoir and create a pressure therein, a plurality of nozzles at the upper portion of said auxiliary reservoir located in proximity to the meshing teeth of the gears and adapted to direct a spray of oil thereon, said auxiliary reservoir being of large capacity relatively to that of the nozzles.

3. In a driving unit comprising a housing having a pair of parallel shafts mounted in bearings therein, and a plurality of pairs of meshing gears mounted on said shafts, a main oil reservoir mounted below said housing and adapted to receive used oil therefrom, an auxiliary reservoir mounted within said housing and extending longitudinally of the shafts below the meshing gears thereon, the upper portion of said auxiliary reservoir being located in proximity to the meshing teeth of the gears, nozzles at the upper portion of the reservoir directed toward the meshing teeth of the gears to direct a spray of oil thereon, and a pump to pump oil from the main reservoir to said bearings and into the auxiliary reservoir and create a pressure therein to force oil through the nozzles to the meshing teeth of the gears, said auxiliary reservoir being of large capacity relatively to that of the nozzle.

4. In a driving unit having a gear housing and meshing gears operatively mounted in bearings therein, an oil reservoir disposed below said housing, an oil port in said housing below the gears, and means to convey oil from said port to the reservoir, an auxiliary reservoir mounted in said housing above said port and in proximity to the meshing teeth of the gears, an oil pump to pump oil from said first named reservoir to said bearings and to said auxiliary reservoir and create a pressure therein, and a nozzle in the upper portion of said auxiliary reservoir in proximity to the meshing teeth of the gears to direct a spray of oil thereon.

In witness whereof, I have hereunto set my hand this 25th day of May, 1927.

WILLIAM E. SYKES.